United States Patent
Hansen et al.

(10) Patent No.: US 11,649,845 B2
(45) Date of Patent: May 16, 2023

(54) MECHANICAL FASTENER SYSTEM FOR ELECTROMAGNETIC EFFECT (EME) PROTECTION

(71) Applicant: The Boeing Company, Chicago, IL (US)

(72) Inventors: Darrin M. Hansen, Seattle, WA (US); Blake A. Simpson, Kent, WA (US); Richard B. Tanner, Seattle, WA (US); Peter K. Augusciak, Shoreline, WA (US)

(73) Assignee: THE BOEING COMPANY, Arlington, VA (US)

( * ) Notice: Subject to any disclaimer, the term of this patent is extended or adjusted under 35 U.S.C. 154(b) by 755 days.

(21) Appl. No.: 16/715,469

(22) Filed: Dec. 16, 2019

(65) Prior Publication Data

US 2021/0180636 A1    Jun. 17, 2021

(51) Int. Cl.
  *F16B 33/06* (2006.01)
  *B64D 45/02* (2006.01)
  *F16B 5/02* (2006.01)

(52) U.S. Cl.
  CPC .............. *F16B 33/06* (2013.01); *B64D 45/02* (2013.01); *F16B 5/02* (2013.01); *F16B 2200/00* (2018.08)

(58) Field of Classification Search
  CPC . F16B 33/06; F16B 5/02; F16B 35/04; B60D 45/02
  USPC ........................................ 361/212, 218, 220
  See application file for complete search history.

(56) References Cited

U.S. PATENT DOCUMENTS

| | | | | |
|---|---|---|---|---|
| 4,042,752 | A * | 8/1977 | Hage | F16B 33/06 428/626 |
| 7,824,142 | B2 * | 11/2010 | Felder | C23C 28/023 411/487 |
| 9,551,373 | B2 | 1/2017 | Tanner et al. | |
| 9,908,637 | B2 | 3/2018 | Whitlock et al. | |
| 2013/0122730 | A1 * | 5/2013 | Pillet | H01R 13/5219 29/869 |
| 2015/0307806 | A1 * | 10/2015 | Sasaki | C09D 183/04 508/211 |
| 2015/0337885 | A1 | 11/2015 | Whitlock et al. | |
| 2018/0057142 | A1 * | 3/2018 | Wilkerson | B64C 3/26 |
| 2018/0079172 | A1 | 3/2018 | Day et al. | |
| 2019/0063485 | A1 | 2/2019 | Khosravani et al. | |

OTHER PUBLICATIONS

Kato et al, "Modern Tribology Handbook, Chapter 21—Metals and Ceramics," 2001, 15 pages.
Wardzinski et al., "The Potential of Indium as a Soft Metal Lubricant Replacement for Lead," 15th European Space Mechanisms & Tribology Symposium, Sep. 2013, 6 pages.
Hansen et al., "Conductive Fastening System and Method for Improved EME Performance," U.S. Appl. No. 16/242,115, filed Jan. 8, 2019.
Brondo et al., "Method for Plating a Metallic Material Onto a Titanium Substrate," U.S. Appl. No. 16/693,613, filed Nov. 25, 2019.

* cited by examiner

*Primary Examiner* — Danny Nguyen
(74) *Attorney, Agent, or Firm* — MH2 Technology Law Group LLP

(57) ABSTRACT

A mechanical fastener system for EME protection, including at least one plated component, wherein the at least one plated component includes a base material, a bonding layer disposed over the base material, and a metal plating disposed over the bonding layer.

20 Claims, 4 Drawing Sheets

MECHANICAL FASTENER SYSTEM FOR ELECTROMAGNETIC EFFECT (EME) PROTECTION

TECHNICAL FIELD

The present disclosure generally relates to mechanical fastener systems. And more particularly, to mechanical fastener systems for electromagnetic effects (EME) protection.

BACKGROUND

Mechanical fasteners are widely used for joining two or more components of a structural assembly. For example, mechanical fasteners are extensively used for joining the structural components or substrates of an aircraft airframe by themselves or as part of a mechanical fastener system including sleeves, nuts, washers, collars, etc. Mechanical fasteners are often fabricated out of titanium due to the desirable light weight, excellent strength-weight ratio, and corrosion resistant qualities of titanium. However, titanium also has some negative qualities that limit its use: it suffers from poor wear resistance (it galls easily) and it may be galvanically incompatible with aluminum alloys that are used for major fuselage and wing structure applications. In addition, aircraft also experience electromagnetic effects (EME) from a variety of sources, such as lightning strikes, which may be concentrated at the joints created by the fasteners. For example, lightning currents may travel through structural joints via fasteners and the structural layers in contact with the fasteners may provide the pathways for current mobility. Metallic aircraft structures are readily conductive and, thus, may be less susceptible to EME. However, composite aircraft structures (e.g., carbon fiber reinforced thermoset and thermoplastic composite structures) may have a lower conductivity than traditional aluminum or metallic structures, and poor fiber connectivity to the fastener may inhibit current flow and increase current density. Increasing current density may give rise to ignition sources, such as heat and thermal decomposition of surrounding organics, causing hot particle ejection or arcing across poorly connected interfaces. Accordingly, improving a conduction path between the fastener and the composite structure may reduce the likelihood of sparking or other problematic EME.

Accordingly, there is a need for mechanical fastener systems incorporating desirable metals, such as titanium, and offering EME protection.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing a mechanical fastener system for EME protection, including at least one plated component, wherein the at least one plated component includes a base material, a bonding layer disposed over the base material, and a metal plating disposed over the bonding layer.

The at least one plated component may include one or more of: a fastener including a head, a threaded portion, and a shank extending between said head and said threaded portion; a nut configured to engage a threaded portion of a fastener; a collar configured to engage a threaded portion of a fastener; a washer configured to be disposed on a fastener between a threaded portion and a head of the fastener; and a sleeve configured to engage a threaded portion of a fastener, wherein the sleeve is configured to deform when engaged by the fastener.

The mechanical fastener system for EME protection may further include one or more components, wherein the one or more components include one or more of: a fastener comprising a head, a threaded portion, and a shank extending between said head and said threaded portion; a nut configured to engage a threaded portion of a fastener; a collar configured to engage a threaded portion of a fastener; a washer configured to be disposed on a fastener between a threaded portion and a head of a fastener; and a sleeve configured to engage a threaded portion of a fastener, wherein the sleeve is configured to deform when engaged by the fastener.

The base material for the plated component may include at least one of titanium, corrosion-resistant steel, Inconel, and alloys or combinations thereof.

The base material for the plated component may have a hydrogen content of about 0.0125 weight % (125 PPM) or lower.

The base material for the plated component may include an etched base material layer.

The bonding layer may be disposed on the etched base material layer of the base material, and there may be substantially no protective oxide layer between the base material and the bonding layer.

The bonding layer may include one or more conductive metals.

The bonding layer may include one or more of nickel, iron, copper, and alloys or combinations thereof.

The bonding layer may have a thickness from about 0.01 mils to about 0.5 mils.

The metal plating may include one or more lubricious and conductive metals.

The metal plating may include at least one of indium, tin, zinc, bismuth, and alloys and combinations thereof.

The metal plating may include indium.

The metal plating may have a thickness from about 0.05 mils to about 1.0 mils.

A friction coefficient of the metal plating may be equal to or lower than the friction coefficient of a soft metal.

A friction coefficient of the metal plating may be equal to or lower than a friction coefficient of indium (In).

A conductivity of the metal plating may be from about $2 \times 10^5$ S/m to about $6.3 \times 10^7$ S/m.

The metal plating may be galvanically compatible with at least one of titanium, corrosion-resistant steel, Inconel, aluminum, and alloys and combinations thereof.

The foregoing and/or other aspects and utilities embodied in the present disclosure may be achieved by providing a joined structure with EME protection, including two or more substrates; and at least one mechanical fastener system including at least one plated component, wherein the at least one plated component includes a base material, a bonding layer disposed on the base material, and a metal plating disposed on the bonding layer, wherein the at least one mechanical fastener system is used to join the two or more substrates, and wherein the two or more substrates may include composite substrates, metal substrates, and combinations thereof.

A friction coefficient of the metal plating may be equal to or lower than the friction coefficient of indium (In), and a conductivity of the metal plating may be from about $2\times10^5$ S/m to about $6.3\times10^7$ S/m.

Further areas of applicability will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
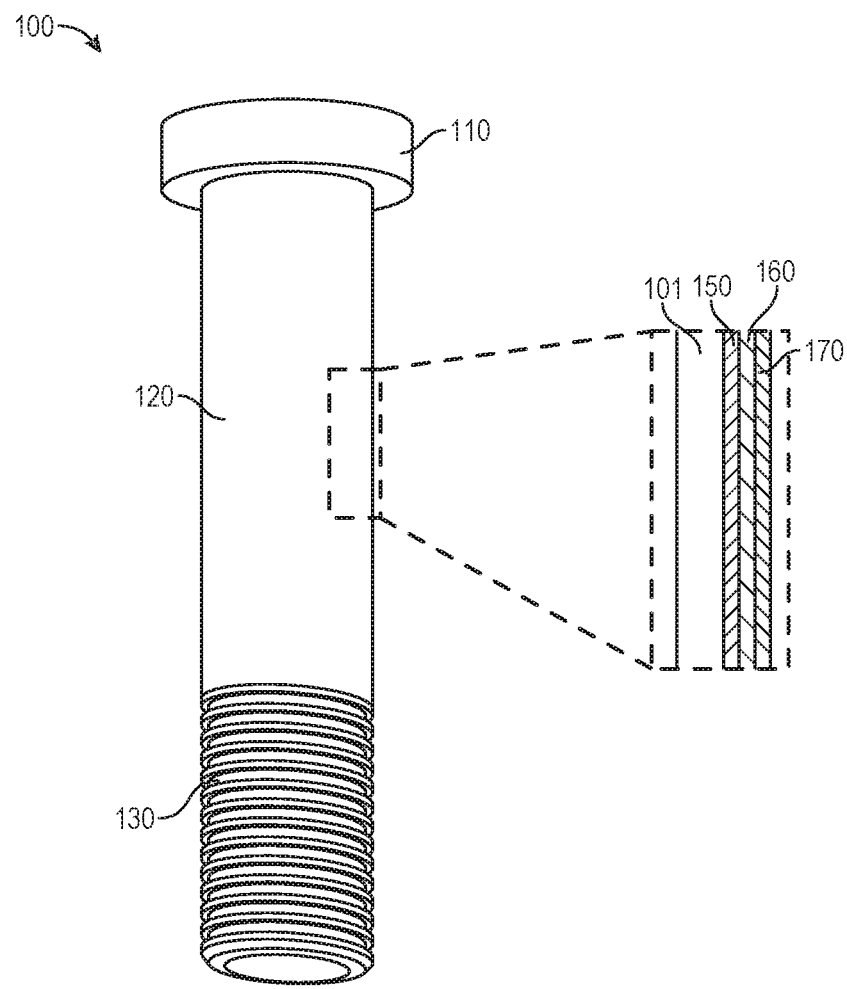
FIG. 1 illustrates a plated component of the mechanical fastener system according to an implementation.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

Throughout the specification and claims, the following terms take the meanings explicitly associated herein, unless the context clearly dictates otherwise. Phrases, such as, "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations can be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes implementations containing A, B, or C, multiple examples of A, B, or C, or combinations of A/B, A/C, B/C, A/B/B/B/B/C, A/B/C, etc. In addition, throughout the specification, the meaning of "a," "an," and "the" include plural references. The meaning of "in" includes "in" and "on."

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

All physical properties that are defined hereinafter are measured at 20° to 25° Celsius unless otherwise specified.

When referring to any numerical range of values herein, such ranges are understood to include each and every number and/or fraction between the stated range minimum and maximum, as well as the endpoints. For example, a range of 0.5% to 6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith.

Unless otherwise specified, all percentages and amounts expressed herein and elsewhere in the specification should be understood to refer to percentages by weight. The percentages and amounts given are based on the active weight of the material. For example, for an active ingredient provided as a solution, the amounts given are based on the amount of the active ingredient without the amount of solvent or may be determined by weight loss after evaporation of the solvent.

With regard to procedures, methods, techniques, and workflows that are in accordance with some implementations, some operations in the procedures, methods, techniques, and workflows disclosed herein can be combined and/or the order of some operations can be changed.

The inventors have created a new mechanical fastener system configured for EME protection. The mechanical fastener system may include a plurality of components, including mechanical fasteners, and may include at least one plated component. For example, the mechanical fastener system may include one or more of a fastener comprising a head, a threaded portion, and a shank extending between said head and said threaded portion; a nut configured to engage the threaded portion of the fastener; a collar configured to engage the threaded portion of the fastener; a washer configured to be disposed on the fastener between the threaded portion and the head of the fastener; and a sleeve. The sleeve may be configured to engage the threaded portion of the fastener, and in some implementations, the sleeve may be configured to deform when engaged by the fastener.

The mechanical fastener system may be configured for use with both metal and composite structures. The plated components of the mechanical fastener system may be galvanically compatible with the metal and/or composite structures to be fastened. The plated components of the mechanical fastener system may be conductive and may provide desirable levels of lubricity.

As used herein, a mechanical fastener refers to a hardware device configured to join or affix two or more structures, substrates, or objects together. A mechanical fastener may take a variety of forms including bolts, one-sided and two-sided lockbolts, screws, hex drive bolts, blind fasteners and the like. In addition, a mechanical fastener may be a component of a mechanical fastener system including other components, such as nuts, collars, washers, sleeves, and the like.

While various components of the mechanical fastener system are described above, the present disclosure is not limited thereto. The mechanical fastener system may include other suitable components which are well known in the art.

As described above, a mechanical fastener system for EME protection may include at least one plated component. The plated component may include a base material, a bonding or bond promoter layer, and an exterior metal coating or metal plating. In some implementations, all of the components of the mechanical fastener system are plated and in other implementations, only one or more of the components of the mechanical fastener system are plated. For example, the at least one plated component may include one or more of a fastener comprising a head, a threaded portion, and a shank extending between said head and said threaded portion; a nut configured to engage the threaded portion of the fastener; a collar configured to engage the threaded portion of the fastener; a washer configured to be disposed on the fastener between the threaded portion and the head of the fastener; and a sleeve configured to engage the threaded portion of the fastener, wherein the sleeve is configured to deform when engaged by the fastener.

FIG. 1 illustrates a plated component of the mechanical fastener system according to an implementation. In particular, FIG. 1 illustrates a plated fastener 100 as an example of a plated component for a mechanical fastener system 10. The plated fastener 100 may include a head 110, a threaded portion 130, and a shank 120 extending between said head 110 and said threaded portion 130.

In some implementations, some of the components of the mechanical fastener system include titanium, corrosion-resistant steel, Inconel, and alloys or combinations thereof, while other components include other base materials. In other implementations, all of the components of the mechanical fastener system include titanium, corrosion-resistant steel, Inconel, and alloys or combinations thereof. For example, the mechanical fastener system may include a fastener and a base material of the fastener may include titanium and/or an alloy thereof. In other examples, the mechanical fastener system may also include a nut and/or washer, and a base material of the nut and/or washer may be the same or different from the base material of the fastener.

As illustrated in FIG. 1, the plated fastener 100 includes a base material 101, a bonding layer 160, and a metal plating 170. The bonding layer 160 may be disposed on the base material 101. The metal plating 170 may be disposed on the bonding layer 160. In some implementations, the plated fastener 100 also includes an etched base material layer 150.

While FIG. 1 describes a plated fastener 100 as an example of a plated component for the mechanical fastener system 10, the present disclosure is not limited thereto. The plated component may also be embodied as other plated components of the mechanical fastener system 10 including bolts, screws, hex drive bolts, blind fasteners and the like and/or nuts, collars, washers, sleeves, and the like. Furthermore, while FIG. 1 illustrates a straight plated fastener 100, those skilled in the art will appreciate that the plated fastener 100 may also be fabricated into a variety of shapes including, but not limited to, a tapered pin, a straight pin, a threaded lockbolt, a tapered sleeve bolt, a bushing, a tapered lock, a nut, a screw and the like.

The plated component may include various base materials 101. For example, the base material 101 for the plated fastener 100 may include titanium, corrosion-resistant steel, Inconel, and alloys or combinations thereof. Suitable alloys include Ti-6A1-4V and 3AL-2.5V titanium alloys, nickel alloy 718, and A286, 303, 302, and 15-5 steel alloys.

In some implementations, the base material 101 for the plated component, such as the plated fastener 100, consists of one of titanium, corrosion-resistant steel, Inconel, and alloys or combinations thereof. In other implementations, the base material 101 for the plated component, such as the plated fastener 100, consists essentially of one of titanium, corrosion-resistant steel, Inconel, and alloys or combinations thereof. For example, the base material 101 for the plated component, such as the plated fastener 100, may comprise, consist, or consist essentially of titanium and/or a titanium alloy. For example, the base material 101 for the plated fastener 100 may consist essentially of titanium or a titanium alloy.

In some implementations, the base material 101 for the plated fastener 100 includes an etched base material layer 150. The base material 101 may be etched to produce an etched base material layer 150 to facilitate deposition of the bonding layer 160 and the bonding layer 160 may be disposed over the etched base material layer 150 of the base material 101. The base material 101 is subjected to an electrolytic etch to create the etched base material layer 150. In other implementations, the etched base material layer 150 is created by hydrochloric acid activation of the base material 101.

For example, in some implementations, a base material 101 of the plated fastener 100 may include titanium. Plating of titanium substrates is often complicated by an extremely stable titanium oxide layer formed on the surface of titanium substrates. Often referred as a protective oxide layer, this protective oxide layer improves the corrosion resistance of titanium substrates but hinders the effective plating or deposition of metals on titanium substrates.

Accordingly, in some implementations, the bonding layer 160 is disposed on an etched base material layer 150 that substantially lacks any protective oxide layer. For example, the etched base material layer 150 may be substantially free of a protective oxide layer. In other implementations, there is substantially no protective oxide layer between the etched base material layer 150 and the bonding layer 160 or between the base material 101 and the bonding layer 160.

While not bound to any particular theory, the inventors believe that a failure in adhesion of the bonding layer 160 to the base material 101 is a sign that a significant amount of the protective oxide layer is present on the base material 101, whereas, good adhesion signifies that the base material 101 was substantially free of a protective oxide layer. Accordingly, in some implementations, the etched base material layer 150 enhances the adhesion of the bonding layer 160 to the base material 101. For example, the etched base material layer 150 may prevent the flaking, peeling, or non-adhesion of the bonding layer 160 to the base material 101. In some implementations, the adhesion of the bonding layer 160 to the base material 101 with an etched base material layer 150 is superior to the adhesion of the bonding layer 160 to the base material 101 lacking an etched base material layer 150.

In other examples, the base material 101 may include a thin layer of disturbed material and/or slightly embedded grit (called a "Bielby layer") that may also be detrimental to good plating or deposition of metals on the base material 101.

Accordingly, in other implementations, the bonding layer 160 is disposed on an etched base material layer 150 that substantially lacks any Bielby layer. For example, the etched base material layer 150 may be substantially free of a Bielby layer. In other implementations, there is substantially no Bielby layer between the etched base material layer 150 and the bonding layer 160 or between the base material 101 and the bonding layer 160.

In some implementations, the etched base material layer 150 removes a surface of the base material 101. For example, the etched base material layer 150 may remove up to 0.3 mils of the base material 101. In other implementations, the etched base material layer 150 may remove up to 0.25 mils, 0.20 mils, 0.15 mils, or 0.10 mils of the base material 101.

The bonding layer 160 may be disposed over the base material 101 of the plated fastener 100. The bonding layer 160 may be disposed over substantially all of an exterior surface of the plated fastener 100 or the bonding layer 160 may be disposed only over a partial exterior surface of the plated fastener 100. For example, in some implementations, the head 110 or the threaded portion 130 of the plated fastener 100 may be masked to prevent deposition of the bonding layer 160 in those portions of the plated fastener 100.

In some implementations, the bonding layer 160 is impermeable to oxygen. Accordingly, the bonding layer 160 may prevent oxygen ions from binding to an outer surface of the base material 101 and/or the base material etched layer 150 to hinder formation of a protective oxide layer on the base material 101 and/or the base material etched layer 150 covered by the bonding layer 160.

The bonding layer 160 may include one or more conductive metals. For example, the bonding layer 160 may include nickel, iron, copper, and alloys or combinations thereof. The bonding layer 160 may include a nickel-chromium alloy.

Accordingly, the bonding layer 160 may comprise, consist, or consist essentially of at least one of nickel, iron, copper, and alloys or combinations thereof. For example, the bonding layer 160 may consist essentially of a nickel-chromium alloy.

In some implementations, the bonding layer 160 renders an outer surface of the base material 101 and/or the base material etched layer 150 active to a metallic metal facilitating plating of the metal plating 170 thereon. That is, an adhesion of the metal plating 170 is enhanced by the bonding layer 160. In some implementations, the bonding layer 160 prevents flaking or peeling of the metal plating 170. In some implementations, the adhesion of the metal plating 170 to the plated fastener 100 with the bonding layer 160 is superior to the adhesion of the metal plating 170 to a plated fastener 100 lacking the bonding layer 160.

The bonding layer 160 may have a thickness from about 0.01 to about 0.5 mils. For example, the thickness of the bonding layer 160 may be from about 0.05 mils to about 0.25 mils, may be from about 0.1 mils to about 0.15 mils, or may be from about 0.15 mils to about 0.05 mils. In other implementations, the thickness of the bonding layer 160 may be less than 0.1 mils. For examples, when the plated fastener 100 is embodied as a plated nut or plated collar, the thickness of the bonding layer 160 may be less than 0.1 mils.

The metal plating 170 may be disposed over the bonding layer 160. For example, the metal plating 170 may be disposed over substantially all of an exterior surface of the plated fastener 100 or the metal plating 170 may be disposed only over a partial exterior surface of the plated fastener 100. For example, in some implementations, the metal plating 170 corresponds to portions of the plated fastener 100 where the bonding layer 160 is disposed. In some implementations, portions of the plated fastener 100 may be masked to prevent deposition of the metal plating 170 in certain portions, such as the threaded portion 130

In some implementations the metal plating 170 covers about 80 percent or more of an exterior surface of the plated fastener. For example, the metal plating 170 covers about 90 percent or more, about 95 percent or more, or about 99 percent or more of an exterior surface of the plated fastener.

The metal plating 170 may include one or more lubricious and conductive metals. The metal plating 170 may include at least one of indium, tin, zinc, bismuth, and alloys and combinations thereof. The metal plating 170 may also include at least one of silver or nickel. For example, the metal plating may comprise, consist, or consists essentially of at least one of indium, tin, zinc, bismuth, silver, nickel, and alloys and combinations thereof.

The metal plating 170 may include at least one of a tin-indium alloy, a zinc-indium alloy, a tin-zinc alloy, a tin-bismuth alloy, and combinations thereof. For example, the metal plating 170 may comprise, consist, or consist essentially of at least one of a tin-indium alloy, a zinc-indium alloy, a tin-zinc alloy, a tin-bismuth alloy, and combinations thereof In one implementation, the metal plating 170 includes indium and/or an indium alloy. The indium alloy may include a tin-indium alloy or a zinc-indium alloy. For example, the metal plating 170 may comprise, consist, or may consist essentially of indium and/or an indium alloy. In some implementations, the metal plating 170 may include from about 1.0 weight % to about 100 weight % indium. For example, the metal plating 170 may include 80 weight % or more, 90 weight % or more, 95 weight % or more, or 99 weight % or more indium.

A material of the metal plating 170 may be selected according to a compatibility to the material of the bonding layer 160. For example, if the bonding layer 160 includes nickel, the metal plating 170 may include indium. However, those skilled in the art will appreciate that various other combinations of materials for the bonding layer 160 and the metal plating 170 may be employed without departing from the scope of the present disclosure.

The metal plating 170 may have a thickness from about 0.05 mils to about 1.0 mils. For example, the thickness of the metal plating 170 may be from about 0.1 mils to about 0.60 mils or from about 0.20 mils to about 0.5 mils.

In some implementations, the thickness of the metal plating 170 is uniform over the surface of the plated fastener 100 covered by the metal plating 170. In other implementations the thickness of the metal plating 170 varies over the surface of the plated fastener 100 covered by the metal plating 170. For example, the thickness of the metal plating 170 may be less over threaded portions of the plated component. The metal plating 170 may have a thickness of about 0.2 mils or less over the threaded portion 130 of the plated fastener 100.

A friction coefficient of a material can be used to quantify the lubricity of a material. For example, when used as a thin film coating layer over a metal substrate, the thin film lubrication of a material can be given in terms of a friction coefficient (µ) according to the following formula (1):

$$\mu = \tau s / P_y, \quad (1)$$

where τs is the shear strength of the thin film coating layer and $P_y$ is the yield point of the base material or metal substrate. Table 1 below illustrates the friction coefficient (µ) values for indium, tin, and cadmium when tested over a Ti6AL-4V titanium substrate.

TABLE 1

| thin film coating layer material | shear strength (τs) | Yield Point ($P_y$) of Titanium Substrate (Ti6V-4AL) | Friction Coefficient (µ) |
|---|---|---|---|
| Indium | 890 | 128000 | 0.006953 |
| Tin | 18183 | 128000 | 0.142055 |
| Cadmium | 6276 | 128000 | 0.049031 |

Other known methods of measuring the lubricity of metal coatings include evaluating the soft-metal thin film friction coefficient at the sliding interface between hard materials. For example, by evaluating the thin film lubrication of soft pure metals in sliding of a Si3N4 pin on SUS440C stainless steel disk in high vacuum in terms of friction coefficient.

Accordingly, in some implementations, a friction coefficient of the metal plating 170 may be equal to or lower than the friction coefficient of a soft metal. For example, the metal plating 170 may have a friction coefficient equal to or lower than a friction coefficient of gold (AU). The metal plating 170 may have a friction coefficient equal to or lower than a friction coefficient of silver (Ag). The metal plating 170 may have a friction coefficient equal to or lower than a friction coefficient of antimony (Sb). The metal plating 170 may have a friction coefficient equal to or lower than a friction coefficient of tin (Sn). The metal plating 170 may have a friction coefficient equal to or lower than a friction coefficient of Bismuth (Bi). The metal plating 170 may have a friction coefficient equal to or lower than a friction coefficient of lead (PB). The metal plating 170 may have a friction coefficient equal to or lower than a friction coefficient of indium (In).

The metal plating 170 may have a conductivity generally higher than that of composite substrates. For example, a conductivity of the metal plating 170 may be in the metallic range. A conductivity of the metal plating 170 may vary from about the conductivity of carbon to that of aluminium. In other implementations, the conductivity of the metal plating 170 may vary from about the conductivity of nickel to that of copper or silver.

In some implementations, the conductivity of the metal plating 170 may range from about $2 \times 10^5$ Siemens/meter (S/m) to about $6.3 \times 10^7$ S/m. For example, the conductivity of the metal plating 170 may range from about $1.43 \times 10^7$ S/m to about $6.3 \times 10^7$ S/m The metal plating 170 may be galvanically compatible with at least one of titanium, corrosion-resistant steel, Inconel, aluminum, and alloys and combinations thereof. For example, when the plated fastener 100 of the mechanical fastener system 10 is used on an aluminum substrate, the metal plating 170 of the plated fastener 100 may serve as a sacrificial coating to the aluminum substrate. In other implementations, the metal plating 170 is configured to serve as a sacrificial layer to a substrate comprising at least one of titanium, corrosion-resistant steel, Inconel, aluminum, and alloys and combinations thereof.

The metal plating 170 may not diffuse into plated components of the mechanical fastener system 10. For example, the metal plating 170 may not diffuse into the plated fastener 100. The metal plating 170 may not cause embrittlement of the plated components of the mechanical fastener system 10. For example, the metal plating 170 may not cause embrittlement of the plated fastener 100.

In some implementations, hydrogen content may be used to determine embrittlement. For example, a material plated unto a substrate may diffuse hydrogen into the substrate and promote embrittlement, and a low hydrogen content may be used to indicate a lower embrittlement risk. Accordingly, in one implementations, the base material 101 and/or the etched base material layer 150 of the plated fastener 100 has a hydrogen content of about 0.0125 weight % (125 PPM) or lower. In other implementations, the base material 101 and/or the etched base material layer 150 of the plated fastener 100 has a hydrogen content of about 0.0080 weight % (80 PPM) or lower.

While not bound to any particular theory, the inventors believe that diffusion of a metal into a mechanical fastener may cause embrittlement. Embrittlement of the mechanical fastener may cause load or fatigue cracking. Accordingly, in some implementations, an embrittlement of a plated fastener 100 may be lower when plated with a metal plating 170 according to implementations of the present disclosure as opposed to other metal plating, such as cadmium plating.

The metal plating 170 may be electroplated to the plated components of the mechanical fastener system 10. For example, the metal plating 170 may be electroplated to the plated fastener 100 and/or other plated components of the mechanical fastener system 10.

In other implementations, the metal plating 170 may be deposited by other suitable methods known in the art. For example, the metal plating 170 may be deposited via electrodeposition, thin-film deposition, and sputter deposition, among other possible options.

The mechanical fastener system of the present disclosure may be used to join one or more substrates or structures into a structure with EME protection. For example, a joined structure with EME protection, may include two or more substrates; and at least one mechanical fastener system according to the present disclosure, wherein the at least one mechanical fastener system is used to join the two or more substrates. The two or more substrates may include composite substrates, metal substrates, and combinations thereof.

The composite substrates may include carbon fiber reinforced plastic (CFRP) substrates, carbon fiber reinforced thermoset substrates, and thermoplastic composite substrates. The metal substrates may include titanium and/or titanium alloy substrates, aluminum and/or aluminum alloy substrates, corrosion-resistant steel (CRES), Inconel, and alloys and combinations thereof.

Figure 2:
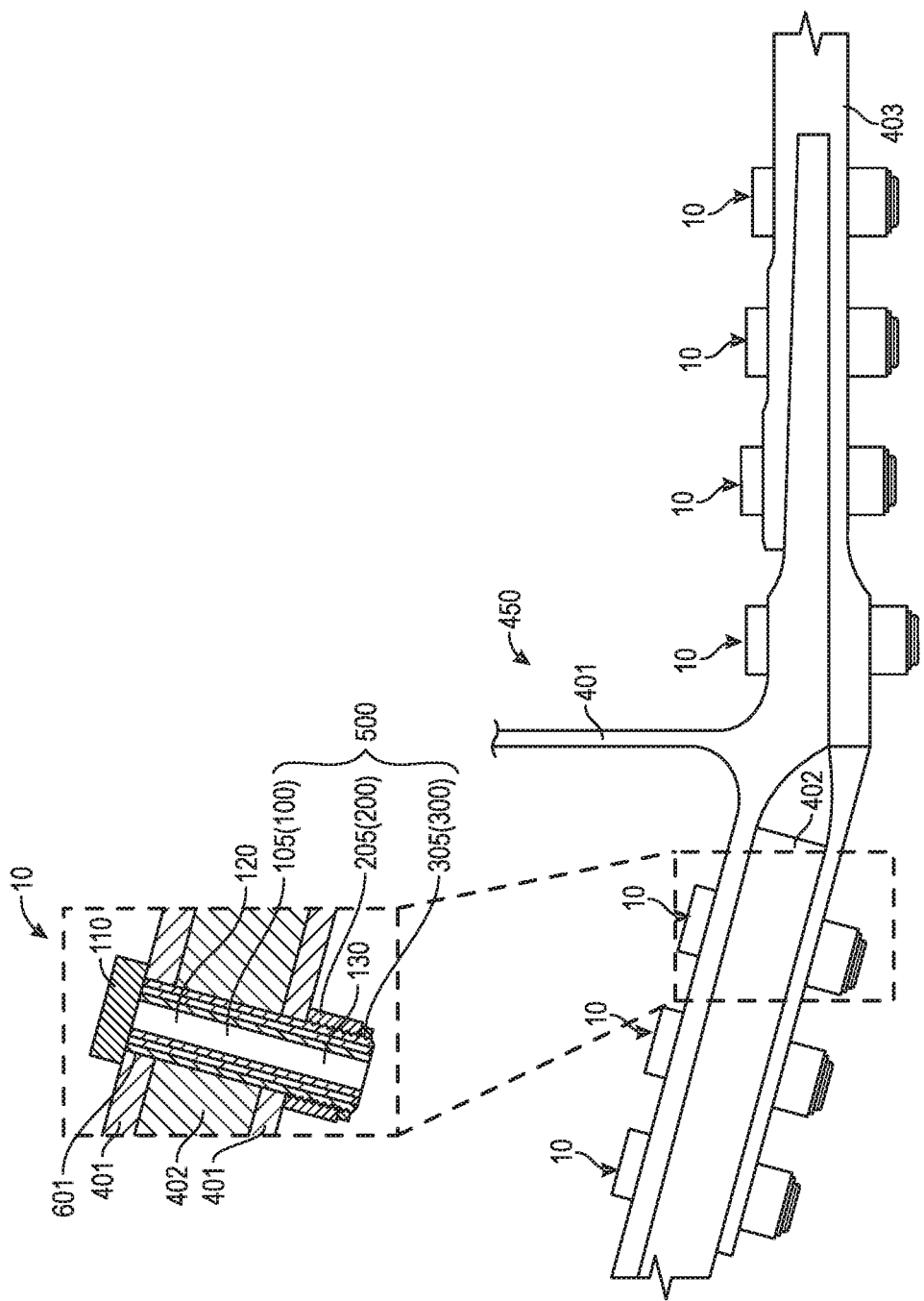
FIG. 2 illustrates a structural assembly joined by mechanical fastener systems according to an implementation.

FIG. 2 illustrates a joined structure with EME protection joined by mechanical fastener systems according to an implementation. In particular, FIG. 2 illustrates a joined structure 450 consisting of a variety of substrates 400 (401-403) joined by mechanical fastener systems 10. As illustrated in FIG. 2, each mechanical fastener systems 10 includes a number of components, a fastener (100 or 105) including a head 110, a threaded portion 130, and a shank 120 extending between said head and said threaded portion (see FIG. 1); a collar (200 or 205) configured to engage the threaded portion 130 of the fastener (100 or 105); a washer (300 or 305) configured to be disposed on the fastener (100 or 105) between the threaded portion 130 and the head 110 of the fastener (100 or 105). As illustrated in FIG. 2, the substrates 400 joined by the mechanical fastener systems 10 include a titanium substrate 401, a CFRP substrate 402, and an aluminum substrate 403.

One or more of the components of the mechanical fastener systems 10 may be plated (plated components 500). For example, the fastener 105 may be implemented as a plated fastener 100 in one or more of the mechanical fastener systems 10. In other implementations, the collar 205 may be implemented as a plated collar 200 in one or more of the mechanical fastener systems 10 and the washer 305 may be implemented as a plated washer 300 in one or more of the mechanical fastener systems 10.

The plated components 500 of the mechanical fastener systems 10 may improve the bonding and grounding capabilities of the mechanical fastener systems 10 when used to join together the substrates 400. The plated components 500 of the mechanical fastener systems 10 may improve an electrical connection of a joined structure 450 to lower resistance current paths. For example, the plated components 500 may be configured to meet installation force, EME protection, and bonding requirements when used to join together the substrates 400 into a joined structure 450. In addition, the plated components 500 of the mechanical fastener systems 10 may provide corrosion resistance and/or galvanic compatibility with the substrates 400.

In some implementations, the substrates 400 include pre-drilled holes and the mechanical fastener systems 10 are configured for installation into the pre-drilled holes to join together the substrates 400. For example, the mechanical fastener system 10 may be configured for installation in a clearance hole, a transition hole, and/or an interference fit hole drilled into the substrates 400. In some implementations, the plated components 500 of the mechanical fastener system 10 may facility the installation of the mechanical fastener system 10 in the drilled holes.

As described above, the metal plating 170 of the plated components 500 may include one or more lubricious and conductive metals. For example, as illustrated in FIG. 2, a lubricious nature of a metal plating 170 of a plated fastener 100 may facilitate the installation of a standard sleeveless fastener in an interference condition hole 601. The mechanical fastener system 10 and/or the plated components 500 may be configured for installation in an interference condition hole without damage or delamination to the substrates 400. In some implementations, the mechanical fastener system 10 and/or the plated components 500 may further include one or more supplemental lubricity agents.

In some implementations, the plated components 500 may have a lubricity equivalent to that of soft metals. For example, a friction coefficient of the plated components 500 may correspond to the friction coefficient of a soft metal. For example, the plated components 500 may have a friction coefficient equal to or lower than the friction coefficient of gold (AU). The plated components 500 may have a friction coefficient equal to or lower than the friction coefficient of silver (Ag). The plated components 500 may have a friction coefficient equal to or lower than the friction coefficient of antimony (Sb). The m plated components 500 may have a friction coefficient equal to or lower than the friction coefficient of tin (Sn). The plated components 500 may have a friction coefficient equal to or lower than the friction coefficient of Bismuth (Bi). The plated components 500 may have a friction coefficient equal to or lower than the friction coefficient of lead (PB). The plated components 500 may have a friction coefficient equal to or lower than a friction coefficient of indium (In).

When lightning strikes an aircraft structure joined by fasteners, a significant portion of the current may pass into nearby structures through the fasteners. While not bound to any particular theory, it is believed that differences in the conductive properties between substrates joined by the fasteners may produce heat or sparking that must be mitigated with additional parts or processes. For example, lightning currents travel through structural joints via fasteners, and the layers in contact with the fasteners provide the pathways for current mobility. In many cases only the carbon fibers of a composite layer are conductive, and a composite layer may be 100-1000× less conductive than a metallic layer. Accordingly, when bare titanium fasteners are used to join composite substrates, the bare titanium fasteners with a less conductive protective oxide layer may increase the current density in the joint and accumulate heat and energy in a manner that may become a spark source. Bare titanium fasteners are often installed with cap seals or sealants to contain the resultant energy. However, poor fiber connectivity between the aircraft structure and the fastener inhibits current flow and increases current density in the joint, giving rise to heat & thermal decomposition of surrounding organics, like sealants, causing hot particle ejection, which is an ignition source. In addition, poor connectivity between the fastener and the structure reduces the surface area over which current can conduct. The reduced area increases the current density, which causes higher temperatures, as well as increasing the ability of the current flow to arc across air gaps.

Alternatively, conductive sleeves may be used. The conductive sleeves in sleeved fasteners expand into the hole when the fastener are installed into the sleeve to provide sufficient connectivity between the carbon fibers in the composite substrate (which carry the current) and the fastener to lower the current density in the joint and the resultant heat that may create spark sources. Lastly, dielectric coatings may be applied to the surface of composite or aluminum substrates to provide a dielectric barrier between the structure and the fastener hardware.

Accordingly, by increasing the connectivity and/or conductivity between a fastener and the carbon fibers of a composite substrate, the effective current density in the fastener hole may be lowered and the likelihood of sparking may be reduced.

Accordingly, the mechanical fastener systems 10 may be configured to improve the grounding capabilities and/or EME protection of the mechanical fastener systems 10 and/or the substrates 400 joined by the mechanical fastener systems 10. For example, the mechanical fastener systems 10 may aid or enhance a conduction path in substrates 400 joined by the mechanical fastener systems 10.

The mechanical fastener systems 10 may be configured for installation where an electrical bond is needed to manage fault currents. In some implementations, the plated components of the mechanical fastener systems 10 may be configured to provide a continuous conductive path between the mechanical fastener systems 10 and the substrates 400. For example, as illustrated in FIG. 2, a metal plating 170 of a plated fastener 100 installed in an interference condition hole 601 may be configured to be in direct conductive contact with the substrates 401-403. In other implementations, the plated fastener may be installed in a clearance and/or a transition fit hole 601. By improving connectivity and/or conductivity through the hole 601, current is flowing over a larger area. Accordingly, the electrical resistance of the joint is reduced, which indicates improved electrical bonding and grounding performance. The plated fastener 100 may then provide a continuous conductive path between the plated fastener 100 and the substrates 401-403. In some implementations, the metal plating 170 of at least one of the plated components 500 is in direct conductive contact with the joined substrates 400. For example, at least one plated component may be configured to provide a continuous conductive path between the least one mechanical fastener system and the two or more substrates joined by the mechanical fastener system.

In other implementations, the plated components 500 may be configured to minimize arcing conditions between airplane structural components, such as substrates 400, and the hardware components joining them together, such as the mechanical fastener systems 10. For example, as illustrated in FIG. 2, a plated collar 200 and/or a plated washer 300 may provide an efficient current path through the substrates 400 and the mechanical fastener systems 10. The use of plated components 500 may negate the need for dielectric or barrier coats that would otherwise be needed to provide a dielectric barrier between the substrates 400 and mechanical fastener systems 10. Because flaws or omission of primer on the structure may create an arcing condition at weak points in the dielectric coatings, the use of mechanical fastener systems 10 according to implementations of the present disclosure minimizes the creation of arcing conditions by creating a conductive pathway through the substrates 400 and the mechanical fastener systems 10.

The mechanical fastener systems 10 may be configured to meet EME conducted current nominal and fault tolerant requirements as well as direct strike nominal and fault tolerant requirements, when used to join composite or metal substrates, such as CFRP/CFRP, CFRP/metal, metal/metal joints and combinations thereof. As used herein, conducted current refers to current that flows across joints, while direct strike refers to current flow through a joint caused by a direct lightning attachment to an exterior surface. For example, the mechanical fastener system may be configured to meet EME conducted current and direct strike requirements for the two or more substrates joined by the mechanical fastener system. In some implementations, a design may be considered to be fault tolerant (i.e. meet EME requirements) if it does not spark below the expected current threat level both nominally, and when subjected to conditions that are anticipated to occur either in production or through the aging lifecycle of the product.

In some implementations, the mechanical fastener systems 10 do not require additional parts or processes, like dielectric coatings, conductive sleeves, seal nuts, seal washers, cap seals, fay seals, or fillet seals, to meet EME conductive current and direct strike nominal and fault tolerant requirements. For example, the plated components 500 of the mechanical fastener systems 10 may lack a dielectric coating. In other implementations, the mechanical fastener systems 10 may not include a conductive sleeve. The mechanical fastener systems 10 may not include additional parts for EME protection, such as seal nuts, seal washers, cap seals, or fillet seals. In other implementations, the mechanical fastener systems 10 may not include any additional containment features to mitigate sparking.

In some implementations, the present disclosure provides a joined structure with EME protection. For example, as illustrated in FIG. 2, a joined structure 450 includes one or more substrates 400 joined together by one or more mechanical fastener systems 10. Each mechanical fastener system 10 may include one or more plated components 500, such as a plated fastener 100. The plated components may include a metal plating 170 including one or more lubricious and conductive metals. The metal plating 170 of at least one of the plated components 500 may be in direct conductive contact with one or more of the joined substrates 400. The mechanical fastener systems 10 may be configured to meet EME conductive current nominal and fault tolerant requirements when joining the substrates 400. The mechanical fastener systems 10 may not include a conductive sleeve. The mechanical fastener systems 10 may not include additional parts for EME protection, such as seal nuts, seal washers, cap seals, fay seals, or fillet seals. The mechanical fastener systems 10 may not include any additional containment features to mitigate sparking.

In some implementations, the present disclosure provides a method of joining substrates into a joined structure with EME protection. For example, a method of joining substrates 400 into a joined structure 450 with EME protection, may include joining the substrates 400 using the one or more mechanical fastener systems 10. Each mechanical fastener system 10 may include one or more plated components 500, such as a plated fastener 100. The plated components may include a metal plating 170 including one or more lubricious and conductive metals. The metal plating 170 of at least one of the plated components 500 may be in direct conductive contact with one or more of the joined substrates 400. The mechanical fastener systems 10 may be configured to meet EME conductive current nominal and fault tolerant requirements when joining the substrates 400. The mechanical fastener systems 10 may not include a conductive sleeve. The mechanical fastener systems 10 may not include additional parts for EME protection, such as seal nuts, seal washers, cap seals, or fillet seals. The mechanical fastener systems 10 may not include any additional containment features to mitigate sparking.

Figure 3:
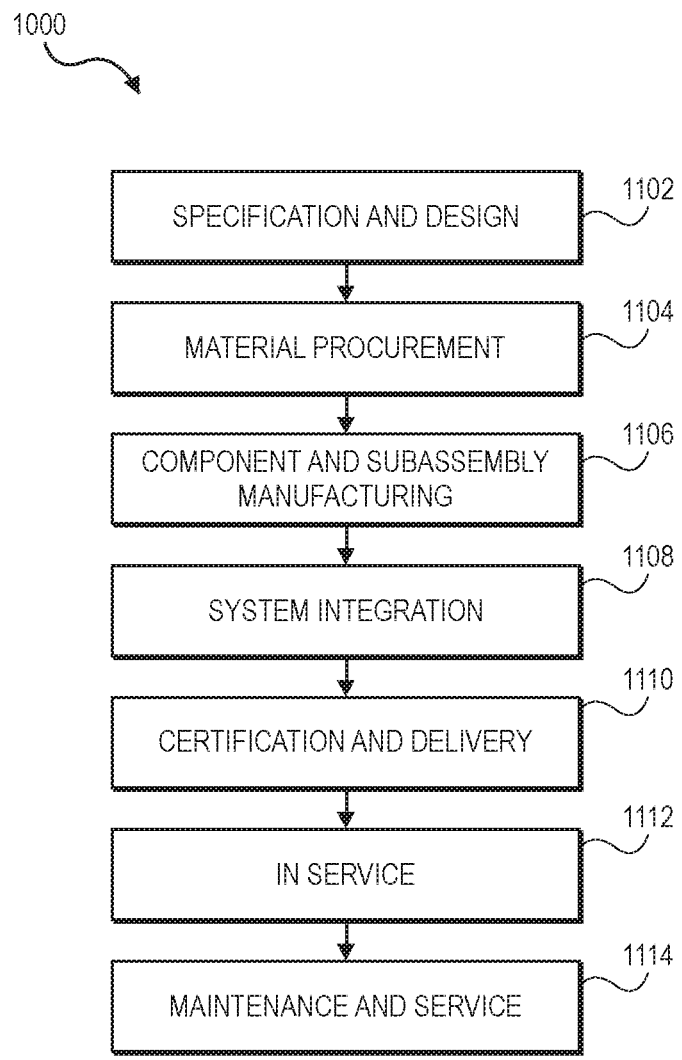
FIG. 3 illustrates a flow diagram of aircraft production and service methodology.
Figure 4:
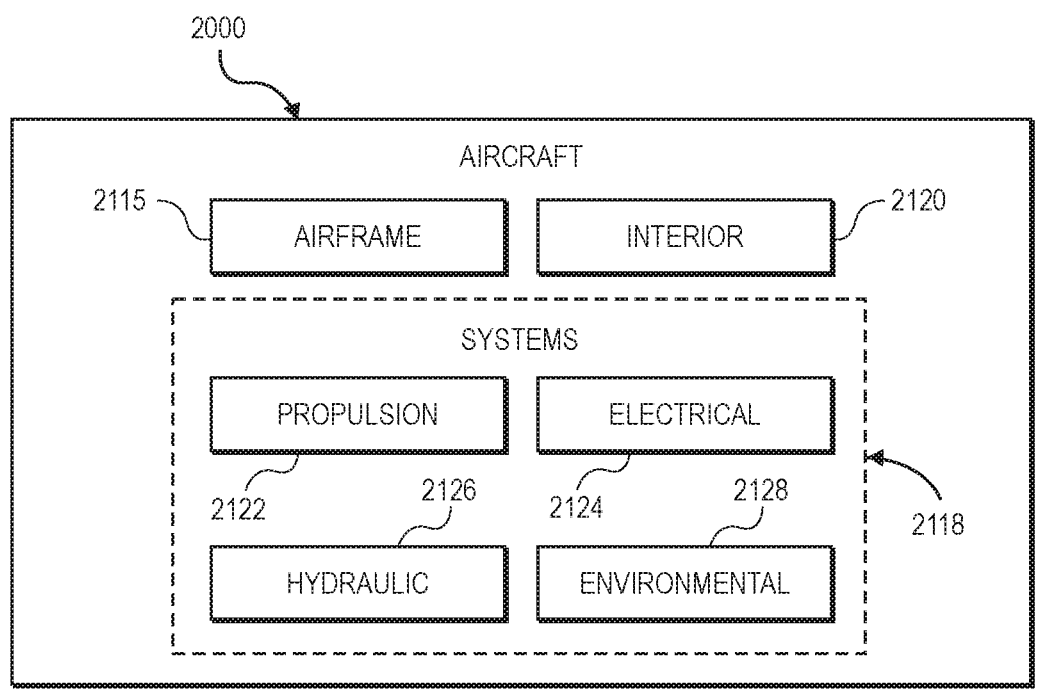
FIG. 4 illustrates a block diagram of an aircraft.

Implementations of the present disclosure may find use in a variety of potential applications, particularly in the transportation industry, including for example, aerospace, marine, automotive applications, and other application where mechanical fastener systems for EME protection are desired. Thus, referring now to FIGS. 3 and 4, implementations of the disclosure may be used in the context of an aircraft manufacturing and service method 1000 as shown in FIG. 3 and an aircraft 2000 as shown in FIG. 4. During pre-production, exemplary method 1000 may include specification and design 1102 of the aircraft 2000 and material procurement 1104. During production, component and subassembly manufacturing 1106 and system integration 1108 of the aircraft 2000 takes place. Thereafter, the aircraft 2000 may go through certification and delivery 1110 in order to be placed in service 1112. While in service by a customer, the aircraft 2000 is scheduled for routine maintenance and service 1114, which may also include modification, reconfiguration, refurbishment, and so on.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 4, the aircraft 2000 produced by exemplary method 1000 may include an airframe 2116 with a plurality of systems 2118 and an interior 2120. Examples of high-level systems 2118 include one or more of a propulsion system 2122, an electrical system 2124, a hydraulic system 2126, and an environmental system 2128. Any number of other systems may be included. Although an aerospace example is shown, the principles of the disclosure may be applied to other industries, such as the marine and automotive industries.

Systems and methods embodied herein may be employed during any one or more of the stages of the production and service method 1000. For example, components or subassemblies corresponding to production process 1106 may be fabricated or manufactured in a manner similar to components or subassemblies produced while the aircraft 2000 is in service. Also, one or more apparatus embodiments, method embodiments, or a combination thereof may be utilized during the production stages 1106 and the 1108, for example, by substantially expediting assembly of or reducing the cost of an aircraft 2000. Similarly, one or more of apparatus embodiments, method embodiments, or a combination thereof may be utilized while the aircraft 2000 is in service, for example and without limitation, to maintenance and service 1114.

While FIGS. 3 and 4 describe the disclosure with respect to aircraft and aircraft manufacturing and servicing, the present disclosure is not limited thereto. The mechanical fastener systems and methods of the present disclosure may also be used for spacecraft, satellites, submarines, surface ships, automobiles, tanks, trucks, power plants, and any other suitable type of objects.

The present disclosure has been described with reference to exemplary implementations. Although a few implementations have been shown and described, it will be appreciated by those skilled in the art that changes can be made in these implementations without departing from the principles and spirit of preceding detailed description. It is intended that the present disclosure be construed as including all such modifications and alterations insofar as they come within the scope of the appended claims or the equivalents thereof.

What is claimed, is:

1. A mechanical fastener system for EME protection, comprising:
    at least one plated component,
    wherein the at least one plated component comprises:
        a base material comprising at least one of titanium, corrosion-resistant steel, Inconel, and alloys or combinations thereof,
        a bonding layer comprising one or more of nickel, iron, copper, and alloys or combinations thereof disposed over the base material, and
        a metal plating comprising at least one of indium, tin, zinc, bismuth, and alloys and combinations thereof disposed over the bonding layer, and
        wherein there is substantially no protective oxide layer between the base material and the bonding layer.

2. The mechanical fastener system for EME protection of claim 1, wherein the at least one plated component comprises one or more of:
    a fastener comprising a head, a threaded portion, and a shank extending between said head and said threaded portion;
    a nut configured to engage a threaded portion of a fastener;
    a collar configured to engage a threaded portion of a fastener;
    a washer configured to be disposed on a fastener between a threaded portion and a head of the fastener; and
    a sleeve configured to engage a threaded portion of a fastener, wherein the sleeve is configured to deform when engaged by the fastener.

3. The mechanical fastener system for EME protection of claim 1, further comprising one or more components,
    wherein the one or more components comprise one or more of:
    a fastener comprising a head, a threaded portion, and a shank extending between said head and said threaded portion;
    a nut configured to engage a threaded portion of a fastener;
    a collar configured to engage a threaded portion of a fastener;
    a washer configured to be disposed on a fastener between a threaded portion and a head of a fastener; and
    a sleeve configured to engage a threaded portion of a fastener, wherein the sleeve is configured to deform when engaged by the fastener.

4. A mechanical fastener system for EME protection, comprising:
    at least one plated component,
    wherein the at least one plated component comprises:
        an etched base material,
        a bonding layer disposed over the etched base material, and
        a metal plating disposed over the bonding layer, and
    wherein there is substantially no protective oxide layer between the etched base material and the bonding layer.

5. The mechanical fastener system for EME protection of claim 1, wherein the base material for the plated component has a hydrogen content of about 0.0125 weight % (125 PPM) or lower.

6. The mechanical fastener system for EME protection of claim 1, wherein the base material for the plated component comprises an etched base material layer.

7. The mechanical fastener system for EME protection of claim 4, wherein the base material for the plated component comprises at least one of titanium, corrosion-resistant steel, Inconel, and alloys or combinations thereof.

8. The mechanical fastener system for EME protection of claim 4, wherein the bonding layer comprises one or more of nickel, iron, copper, and alloys or combinations thereof.

9. The mechanical fastener system for EME protection of claim 1, wherein the bonding layer has a thickness from about 0.01 mils to about 0.5 mils.

10. The mechanical fastener system for EME protection of claim 4, wherein the metal plating comprises one or more lubricious and conductive metals.

11. The mechanical fastener system for EME protection of claim 4, wherein the metal plating comprises at least one of indium, tin, zinc, bismuth, and alloys and combinations thereof.

12. The mechanical fastener system for EME protection of claim 1, wherein the metal plating comprises indium.

13. The mechanical fastener system for EME protection of claim 1, wherein the metal plating has a thickness from about 0.05 mils to about 1.0 mils.

14. The mechanical fastener system for EME protection of claim 10, wherein a friction coefficient of the metal plating is equal to or lower than the friction coefficient of a soft metal.

15. The mechanical fastener system for EME protection of claim 10, wherein a friction coefficient of the metal plating is equal to or lower than a friction coefficient of indium (In).

16. The mechanical fastener system for EME protection of claim 10, wherein a conductivity of the metal plating is from about $2\times10^5$ S/m to about $6.3\times10^7$ S/m.

17. The mechanical fastener system for EME protection of claim 1, wherein the metal plating is galvanically compatible with at least one of titanium, corrosion-resistant steel, Inconel, aluminum, and alloys and combinations thereof.

18. A joined structure with EME protection, comprising:
two or more substrates; and
at least one mechanical fastener system comprising at least one plated component, wherein the at least one plated component comprises an etched base material, a bonding layer disposed on the etched base material, and a metal plating disposed on the bonding layer,
wherein the at least one mechanical fastener system is used to join the two or more substrates,
wherein the two or more substrates comprise composite substrates, metal substrates, and combinations thereof, and
wherein there is substantially no protective oxide layer between the etched base material and the bonding layer.

19. The joined structure with EME protection of claim 18, wherein a friction coefficient of the metal plating is equal to or lower than a friction coefficient of indium (In), and
wherein a conductivity of the metal plating is from about $2\times10^5$ S/m to about $6.3\times10^7$ S/m.

20. The joined structure with EME protection of claim 18, wherein the etched base material comprises at least one of titanium and alloys thereof, and wherein the metal plating comprises indium.

\* \* \* \* \*